United States Patent Office 3,558,562
Patented Jan. 26, 1971

3,558,562
PROCESS FOR FORMING WATER-SOLUBLE POLYAMIDES
David E. Kramm, Laurel, Md., assignor to W. R. Grace & Co., New York, N.Y., a corporation of Connecticut
No Drawing. Filed Nov. 21, 1967, Ser. No. 684,627
Int. Cl. C08g 9/04
U.S. Cl. 260—72
3 Claims

ABSTRACT OF THE DISCLOSURE

A synthetic linear water-soluble polyamide is formed by the reaction of equimolar proportions of iminodiacetonitrile and formaldehyde in the presence of an acid and water to form a polyamide which is watersoluble in the base form or the acid salt form. The polyamide can be reacted with acrylonitrile, acrylamide or acrylic acid to put a substituent on the secondary amine nitrogen. The nitrile or the amide may be hydrolyzed to the acid which readily forms salts. All products are water soluble.

---

The present invention relates to a novel and useful polyamide and process for preparing it. More particularly, it relates to a synthetic linear water-soluble polyamide formed by the reaction of iminodiacetonitrile and formaldehyde.

Synthetic linear polyamides are well known in the art and have received widespread acceptance. Some of the polyamides of the prior art are formed by the reaction of difunctional nitriles with formaldehyde as shown by U.S. Pat. 2,617,786. Such polyamides are water insoluble and are formed from relatively expensive starting materials. Accordingly, the separation procedure is quite complicated and the final products are useless where water solubility is required. It is an object of the present invention to provide water-soluble polyamides by a similar reaction. A further object is to provide polyamides which are useful as water-soluble adhesives. A still further object is to prepare water-soluble polyamides by a process which utilizes the water-soluble properties of the polyamide to accomplish a ready separation from the reaction mixture. A still further object is to provide water-soluble polyamides from relatively inexpensive starting materials. Other objects will become apparent as the description of the invention proceeds.

These objects are accomplished by the present invention which provides a synthetic, water-soluble polyamide containing a recurring structural unit selected from the group consisting of (1) 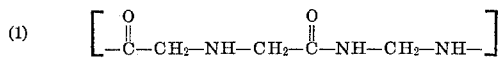

and the acid salts thereof (2) 

wherein R is selected from the group consisting of

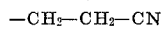

and

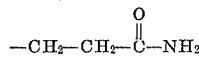

and (3) 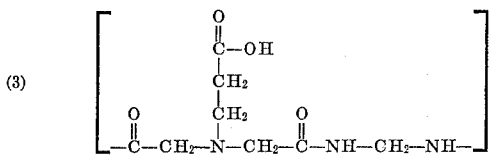

and the salts thereof.

The present invention also provides a process for forming a synthetic, linear, water-soluble polyamide which comprises reacting substantially equimolar proportions of iminodiacetonitrile with formaldehyde in the presence of an acid catalyst and water to form a polyamide salt and adding a water-soluble organic liquid to precipitate the polyamide in the salt form.

The present invention further provides a process for forming a synthetic, linear, water-soluble polyamide which comprises reacting substantially equimolar proportions of iminodiacetonitrile with formaldehyde in the presence of an acid catalyst and water to form a polyamide, adding a water-soluble organic liquid to precipitate the polyamide in the salt form, isolating the polyamide in the salt form and redissolving it in water, neutralizing the polyamide in salt form to form a salt and the polymer in the free base form, fractionally precipitating the salt by the addition of a water-soluble organic liquid, removing the salt and thereafter precipitating the polymer in the free base form by adding an additional amount of the water-soluble organic liquid.

In a preferred embodiment of the present invention the reaction is carried out at a temperature of from about 0° C. to about 50° C., more preferably from about 10° C. to about 20° C., and the acid catalyst is sulfuric acid with the water-soluble organic liquid being a liquid which is completely miscible with water in all proportions.

The reaction of the iminodiacetonitrile with formaldehyde proceeds as follows:

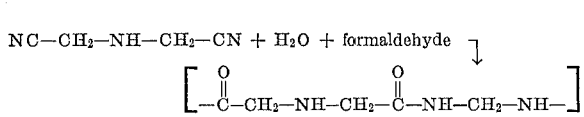

The nitrogen of the secondary amine group

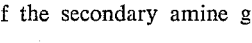

may be reacted with acrylonitrile, acrylamide or acrylic acid to form the corresponding substituent on the polymer chain. The nitrile or the amide group may also be hydrolyzed to the acid which will react with basic compounds to form salts. All of these products are water-soluble.

The term "water-soluble" polyamide signifies that the polyamide is sufficiently soluble in water so as to readily form solutions of the polyamide in water. The acids which may be used to form the "acid salts" of the polyamide are the various weak and strong inorganic and organic acids. Such acids include sulfuric acid, hydrochloric acid, formic acid, boric acid, benzoic acid, chloroacetic acid, para-nitrobenzoic acid, oxalic acid and the like. The salts of the stronger acid will form in aqueous solutions and can be precipitated therefrom. In forming the salts of the weaker acids, the solutions are generally evaporated to dryness to drive the reaction towards the salt formation. The term "salts," as used with the polyamide containing the carboxylic acid substituent, merely signifies that the free carboxylic acid group of the polyamide has been reacted with a basic material, such as an inorganic base or an amine, to form the conventional acid salts.

The "acid catalyst" which may be used for the reaction includes hydrochloric acid, sulfuric acid, formic acid, para-toluene sulfonic acid, monochloroacetic acid and the like. Mixtures of such acids may also be used in the catalyst system. The expression "water-soluble" organic liquid signifies that the liquid is sufficiently soluble in the aqueous solution so as to precipitate the salt and the polyamide from the system. In general, an alcohol such as methanol, ethanol, isopropanol or the like will be used although other materials which are not completely soluble in the water system may likewise be employed. Other water-soluble organic liquids may also be used such as acetone.

In general, the reaction may be run at temperatures up to 70–100° C. but at the elevated temperatures the polymer tends to be discolored which is objectionable in some instances. Accordingly, it is preferred to run the reaction at temperatures below about 50° C. preferably 10 to 20° C. An ice bath serves as a very convenient cooling medium to maintain the reactants at a temperature of 10° C. to 20° C.

The polymer formed by the reaction of iminodiacetonitrile and formaldehyde may be further reacted with acrylonitrile, acrylamide or acrylic acid to give a substituent on the nitrogen of the secondary amine group of the polyamide. The nitrile or amide may be hydrolyzed to the carboxylic acid which may be formed into acid salts as is known in the art. All of these polyamides and salts are water soluble.

The formaldehyde employed in the present invention can be monomeric or polymeric and the term includes all such forms. Thus, formaldehyde, paraformaldehyde or trioxane can be used. For convenience trioxane is generally employed since it is easily handled and measured.

The following examples are given to illustrate the invention and are not intended to limit it in any manner. All parts are given in parts by weight unless otherwise expressed.

EXAMPLE 1

A three liter four neck round bottom flask is equipped with a high speed stirrer in one neck and a reflux condenser in the second neck. Into the third neck is inserted a thermometer which extends nearly to the bottom of the flask and an inlet dropping funnel is placed on the fourth neck. The reflux condenser is removed and 47.55 g. of recrystallized iminodiacetonitrile (0.50 mole) and 15.494 g. of trioxane (0.172 mole) are added to the flask. The reflux condenser is replaced and 200 ml. of 90% formic acid is added through the dropping funnel.

The flask is then placed in an ice bath at 10° C. and 100 ml. of concentrated sulfuric acid is added slowly through the dropping funnel over a period of 21 minutes while maintaining the temperature in the range of 10° C.–14° C. After the addition of sulfuric acid, the ice bath is removed and the stirrer is run for 2½ hours at room temperature (24° C.). The flask is replaced in the ice bath and cooled to 12° C. The reaction mixture is then poured into 2 liters of rapidly stirred dry methanol at room temperature. The polymer agglomerates into a viscous taffy like mass. The mass is removed and dried in 750 ml. of dry methanol which serves to remove impurites and dehydrates the mass. The polyamide, in the form of the bisulfate, is broken up into small pieces. The polyamide is filtered on a Buchner funnel, transferred to a sample bottle and then dried in a vacuum oven. The vacuum oven is at 70° C. and 100 mm. of Hg with a slow sweep of dry air through the oven.

The bisulfate of the polyamide is a free flowing, light yellow powder. It dissolves in water and can be used to make viscous aqueous solutions which are suitable as adhesives. The yield is 89.9 g.

EXAMPLE 2

A three liter four neck round bottom flask is equipped with a high speed stirrer in one neck and a reflux condenser in the second neck. Into the third neck is inserted a thermometer which extends nearly to the bottom of the flask and an inlet dropping funnel is placed in the fourth neck. The reflux condenser is removed and 23.776 g. of recrystallized iminodiacetonitrile (0.250 mole) and 7.747 g. of trioxane (0.086 mole) are added to the flask. The reflux condenser is replaced and 300 ml. of 90% formic acid is added through the dropping funnel.

The flask is then placed in an ice bath at 10° C. and 100 ml. of concentrated sulfuric acid is added slowly through the dropping funnel over a period of ¾ hour while maintaining the temperature in the range of 15° C.–20° C. After the addition of sulfuric acid, the ice bath is removed and the stirrer is run for 1 hour at room temperature (24° C.). The flask is heated with a "Glas-Col" electric heating mantle to a temperature of 40° C.–46° C. for another hour with stirring. The reaction mixture is then cooled to 15° C. with the ice bath and 150 ml. of distilled water is added to the flask followed by 1,500 ml. of ethanol. This procedure precipitates the impure polyamide as the bisulfate salt which has the appearance and consistency of taffy.

The polyamide in salt form is removed from the flask and redissolved in 75 ml. of water. The solution of the polyamide salt is neutralized with a 10% aqueous solution of potassium hydroxide using thymol blue as the indicator. Ethanol is then slowly added to fractionally precipitate the potassium sulfate without precipitating the polyamide. The amount required is about 225 ml. of ethanol. The potassium sulfate is filtered from the liquid. One liter of ethanol is then added to the filtrate which causes the polyamide to be precipitated in the form of the free base. The polyamide is separated from the liquid by decanting the liquid, transferring the wet polyamide to a sample bottle and then vacuum drying. The polyamide is vacuum dried utilizing a vacuum oven at 70° C. and 100 mm. Hg with a slow sweep of dry air through the oven.

The polyamide is light tan in appearnce and quite readily deformable. It dissolves in water and can be used to make viscous aqueous solutions which are suitable as adhesives. The yield is 27.2 g.

EXAMPLE 3

4.025 g. of the bisulfate salt of the polyamide of Example 1 is dissolved in 40 ml. of distilled water. The solution is neutralized to phenolphthalein (pH 8.2) by the dropwise addition of 5% aqueous potassium hydroxide. 3.0 ml. of acrylonitrile is then added to the solution and it is allowed to stand at room temperature (25° C.) overnight (18 hours). 200 ml. of methanol is added to the solution and the polyamide product filtered on a Buchner funnel. The polyamide is transferred to a sample bottle and dried in a vacuum oven as in Example 1.

The cyanoethylated polyamide is obtained in a yield of 0.983 gram. The product is a white, free flowing powder and is readily water-soluble. It can be used as an adhesive as in Example 1. Infrared analysis indicated that the cyanoethylation has taken place on the secondary amine nitrogen.

EXAMPLE 4

4.620 g. of the bisulfate salt of the polyamide of Example 1 is dissolved in 40 ml. of distilled water. The solution is neutralized to phenolphthalein (pH 8.2) by the dropwise addition of 5% aqueous potassium hydroxide. 2.990 g. of acrylamide is then added to the solution and it is allowed to stand at room temperature (25° C.) overnight (18 hours). 200 ml. of methanol is added to the solution and the polyamide product filtered on a Buchner funnel. The polyamide is transferred to a sample bottle and dried in a vacuum oven as in Example 1.

The substituted polyamide is obtained in a yield of 2.895 g. as a free flowing, white, water-soluble powder. The polyamide contains the

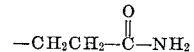

group on the nitrogen of the secondary amine group.

EXAMPLE 5

3.012 g. of the polyamide of Example 2 in the free base form is dissolved in 20 ml. of distilled water and 5.0 ml. of acrylic acid is added to the solution. The pH is adjusted with phenolphthalein (pH 8.2) as the indicator by the dropwise addition of 10% aqueous potassium hydroxide. The mixture is allowed to stand at room temperature (25° C.) overnight (18 hours). 200 ml. of methanol is added to the solution to precipitate the unreacted polyamide. The supernatant liquid is decanted from the unreacted polymer and acidified to a pH of 1 using concentrated hydrochloric acid. The polyamide containing the —CH₂—CH₂—COOH group then precipitates from the solution. The product is filtered on a Buchner funnel, transferred to a sample jar and vacuum dried as in Example 1.

The product is a white, water-soluble solid.

EXAMPLE 6

1 g. of the polyamide product of Example 5 is dissolved in 20 ml. of distilled water containing an indicator amount of phenolphthalein. The solution is then neutralized by the addition of 5% potassium hydroxide and evaporated to dryness to give the potassium salt of the polymer of Example 5.

The product is a white, free flowing powder which is very water-soluble.

EXAMPLE 7

14.3 g. of polyamide of Example 2 in the free base form is dissolved in 10 ml. of distilled water. 100 ml. of a 1 molar solution of hydrochloric acid is slowly added to the solution to form the hydrochloride salt. 500 ml. of methanol is then added to the solution which causes the hydrochloride salt of the polyamide to precipitate. The finely divided polyamide hydrochloride salt is filtered on a Buchner funnel, transferred to a sample bottle and then dried in a vacuum oven as in Example 1.

The product is a slightly yellow, free flowing powder which is readily soluble in water.

EXAMPLE 8

0.201 g. of the polyamide of Example 2 in the free base form is dissolved in 10 ml. of distilled water in a beaker. 0.0864 of boric acid is added to the solution and stirred. The beaker is then placed on a steam bath (about 96° C.) with a stream of dry air over the surface of the solution to evaporate to dryness.

Upon drying, the resulting product forms into a hard, glassy, substantially transparent film on the bottom of the beaker. The melting point of the boric acid salt is in the range 142–145° C. and charring occus at about 240° C.

EXAMPLE 9

0.240 g. of the polyamide of Example 2 in the free base form is dissolved in 10 ml. of distilled water. 17.2 ml. of a 0.1 molar solution of benzoic acid in a 1/1 ethanol/water solution is slowly added. The solution is then placed on a steam bath (about 96° C.) with a stream of dry air over the surface of the solution to evaporate it to dryness.

The product is an opaque, white, tacky material.

While in the above examples unmodified polyamides are prepared, it is obvious that dyes, pigments, fillers and the like may be added to the polyamide without substantial alteration of the physical properties.

The polyamides produced in accordance with the present invention are water-soluble and are useful as adhesives, textile sizings, ceramic binders, water-treating agents, paper coatings and the like.

Many equivalent modifications will be apparent to those skilled in the art from a reading of the foregoing without a departure from the invention concept.

What is claimed is:

1. A process for forming a synthetic water-soluble polyamide which comprises:
 (A) reacting substantially equimolar proportions of iminodiacetonitrile with formaldehyde in the presence of:
  (1) 100 ml. of concentrated sulfuric acid catalyst, and
  (2) 200 to 300 ml. of 90% formic acid in water per 0.250 to 0.500 mole of iminodiacetonitrile to form the bisulfate salt of a polyamide, said polyamide containing a recurring structural unit selected from the group consisting of:

a) 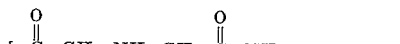

b) 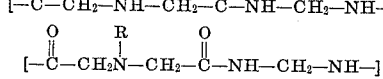

wherein R is selected from the group consisting of —CH₂—CH₂—CN and

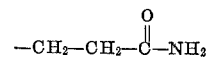

and c) 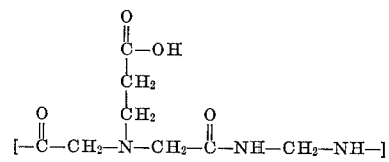

(B) adding a water-soluble organic liquid selected from the group consisting of methanol, ethanol, isopropanol and acetone to precipitate the bisulfate salt of a polyamide;
 (C) isolating the bisulfate salt of a polyamide;
 (D) redissolving the said polyamide salt isolated in Step C in water;
 (E) neutralizing the redissolved polyamide salt to form a salt and the polyamide in the free base form;
 (F) fractionally precipitating the salt by the addition of a water-soluble organic liquid defined in Step B;
 (G) removing the fractionally precipitated salt; and thereafter
 (H) precipitating the polyamide in the free base form by adding an additional amount of the water-soluble organic liquid defined in Step B.

2. The process of claim 1 wherein the reaction of iminodiacetonitrile and formaldehyde is carried out at a temperature of from about 0° C. to about 50° C.

3. The process of claim 1 wherein the reaction of iminodiacetonitrile and formaldehyde is carried out at a temperature of from about 10° C. to about 20° C.

References Cited

UNITED STATES PATENTS 2,537,689    1/1951    Mowry et al. _____ 260—72

WILLIAM H. SHORT, Primary Examiner

R. J. KOCH, Assistant Examiner

U.S. Cl. X.R.

260—29.4